(No Model.) 6 Sheets—Sheet 1.

O. E. MICHAUD.
STREET CAR REGISTER.

No. 541,373. Patented June 18, 1895.

(No Model.)  6 Sheets—Sheet 2.

O. E. MICHAUD.
STREET CAR REGISTER.

No. 541,373.  Patented June 18, 1895.

Attest:
C. A. Smith
A. P. Paxson

Inventor:
O. E. Michaud,
By Carr & Carr
Attys (No Model.) 6 Sheets—Sheet 3.
O. E. MICHAUD.
STREET CAR REGISTER.

No. 541,373. Patented June 18, 1895.

Attest,
O. A. Smith
H. R. Paxson

Inventor
O. E. Michaud,
By Carr & Carr
Attys.

(No Model.)  O. E. MICHAUD.  6 Sheets—Sheet 4.
STREET CAR REGISTER.
No. 541,373.  Patented June 18, 1895.
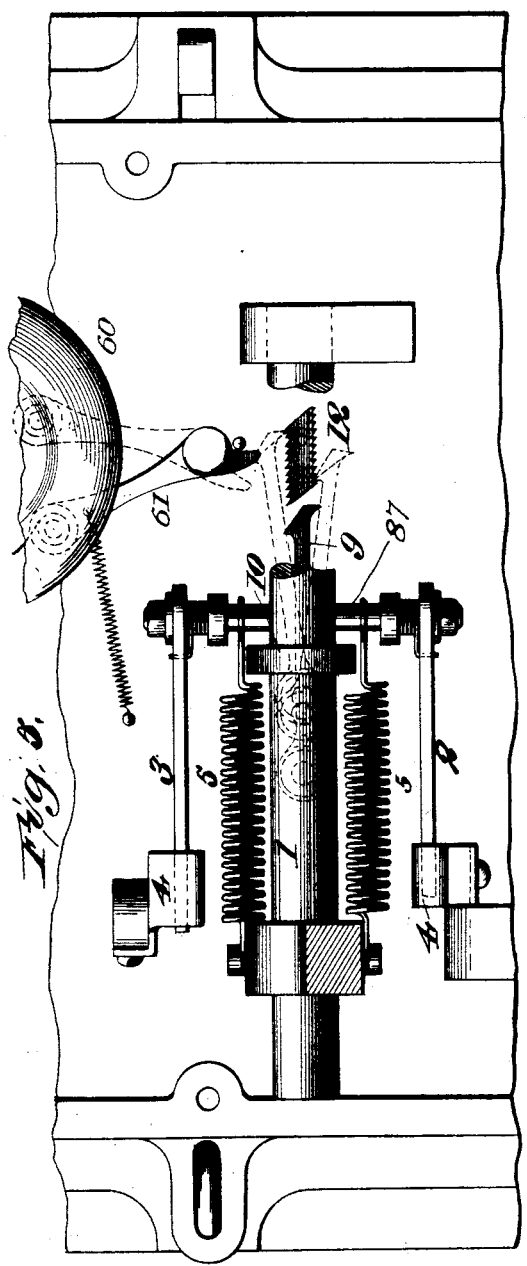
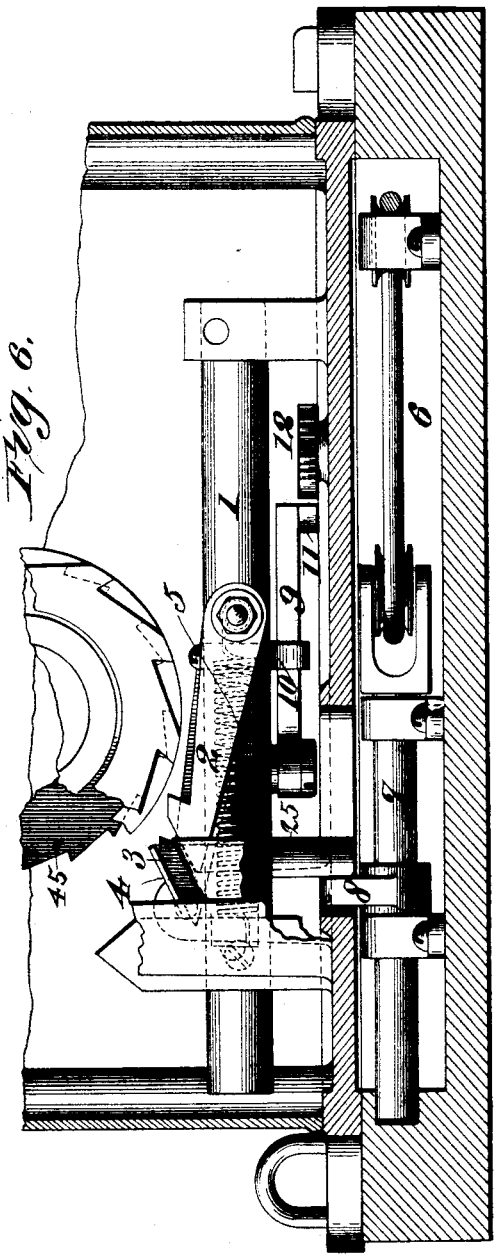

(No Model.) 6 Sheets—Sheet 5.
O. E. MICHAUD.
STREET CAR REGISTER.
No. 541,373. Patented June 18, 1895.
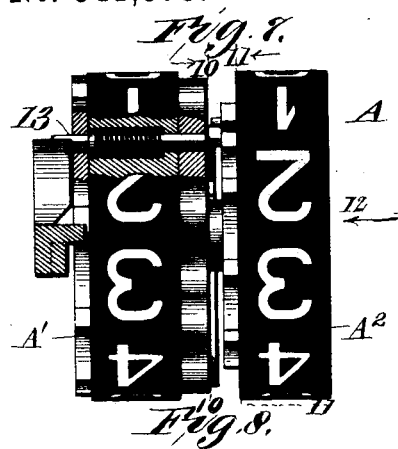
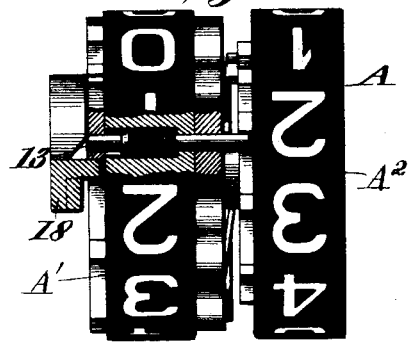
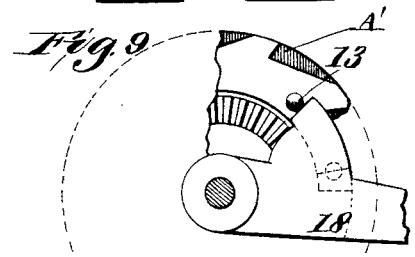
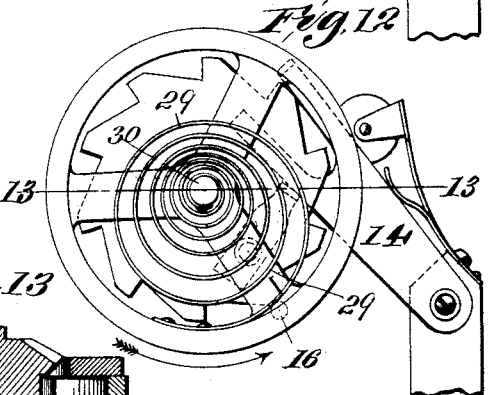
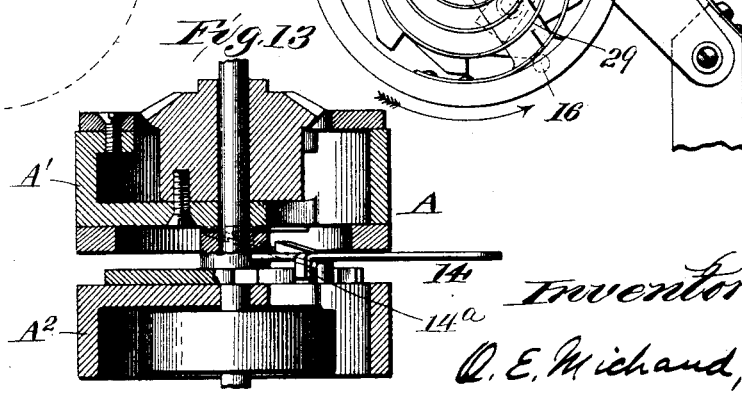
Attest:
C. A. Smith
A. P. Paxson
Inventor
O. E. Michaud,
By Carr & Carr
Attys.

(No Model.) 6 Sheets—Sheet 6.
O. E. MICHAUD.
STREET CAR REGISTER.
No. 541,373. Patented June 18, 1895.
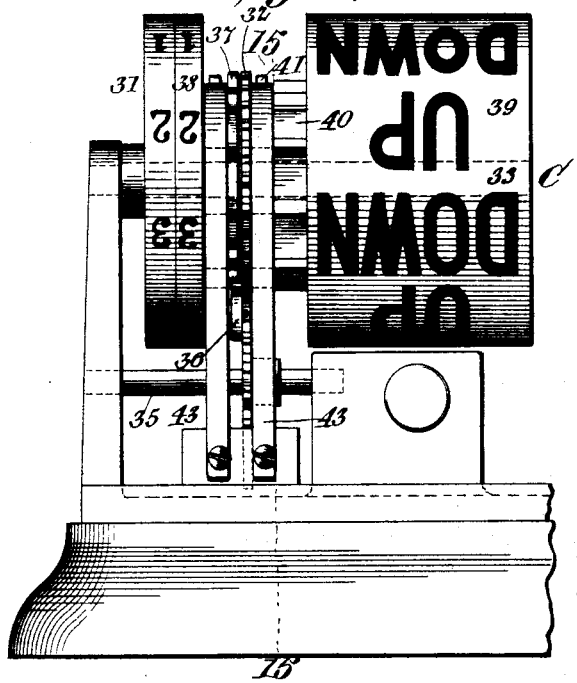
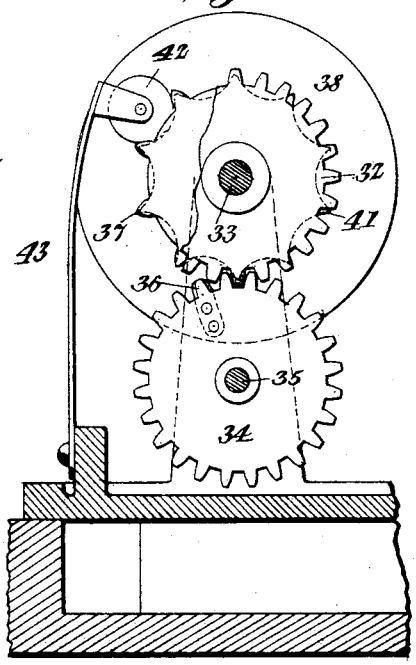
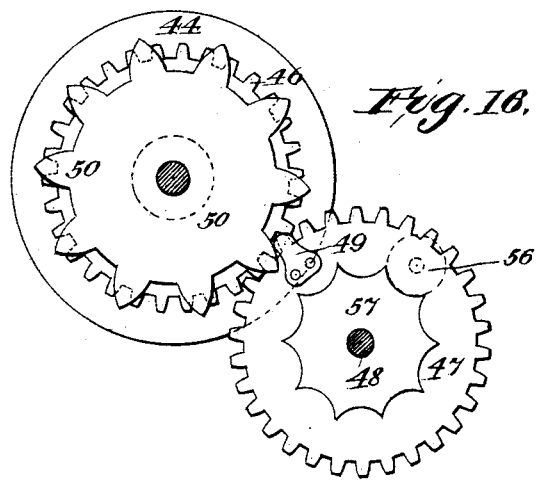
Attest
O. A. Smith
H. P. Paxson
Inventor:
O. E. Michaud,
By Carr & Carr
Attys.

UNITED STATES PATENT OFFICE.

ONESIME E. MICHAUD, OF ST. LOUIS, MISSOURI.

STREET-CAR REGISTER.

SPECIFICATION forming part of Letters Patent No. 541,373, dated June 18, 1895.

Application filed July 21, 1894. Serial No. 518,195. (No model.)

*To all whom it may concern:*

Be it known that I, ONESIME E. MICHAUD, residing in the city of St. Louis, State of Missouri, have invented a new and useful Improvement in Street-Car Registers, of which the following is a specification.

My invention relates to street car registers and has for its principal object to insure the accurate register of every fare, to insure the accurate count of fares for each trip and to improve the mechanical construction, arrangement and combination of the several elements.

To these ends the invention consists in the construction and combinations herein described and claimed.

Figure 1:
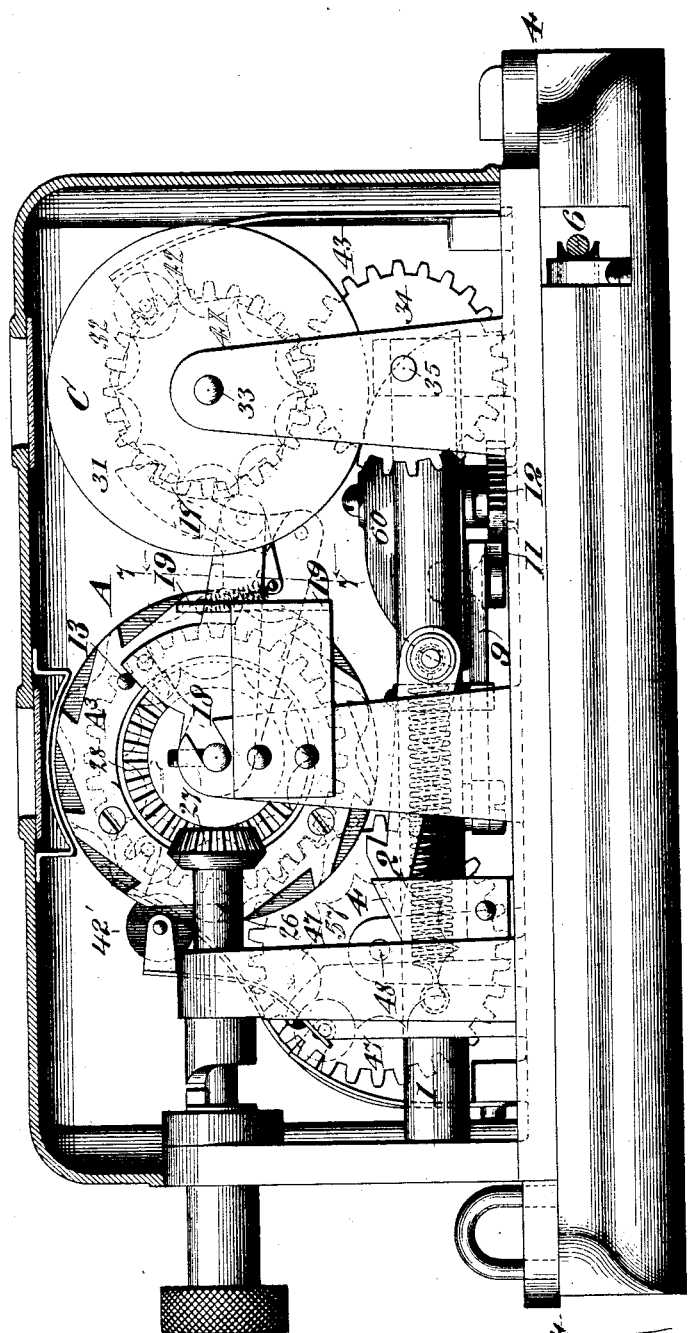
Figure 2:
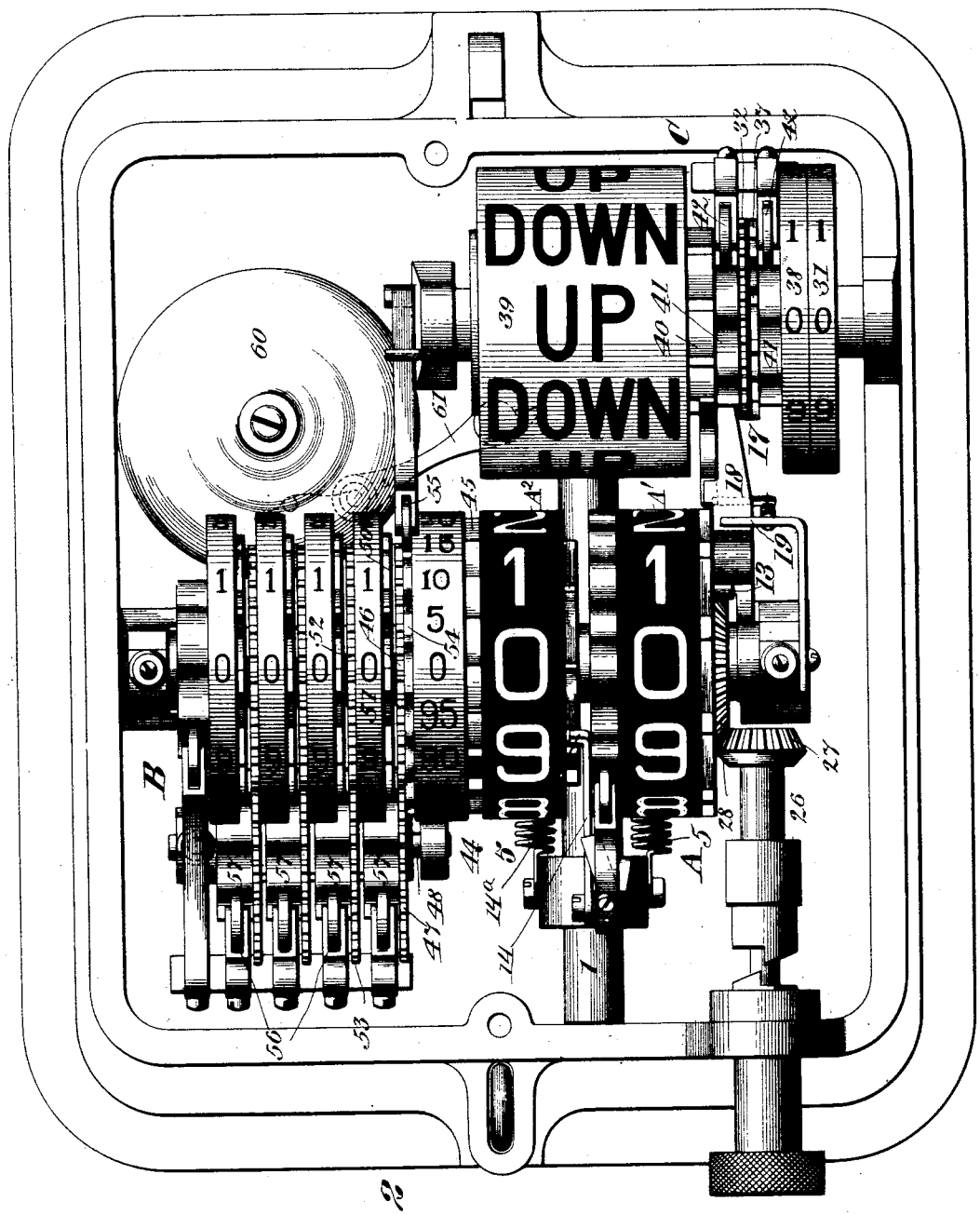
Figure 4:
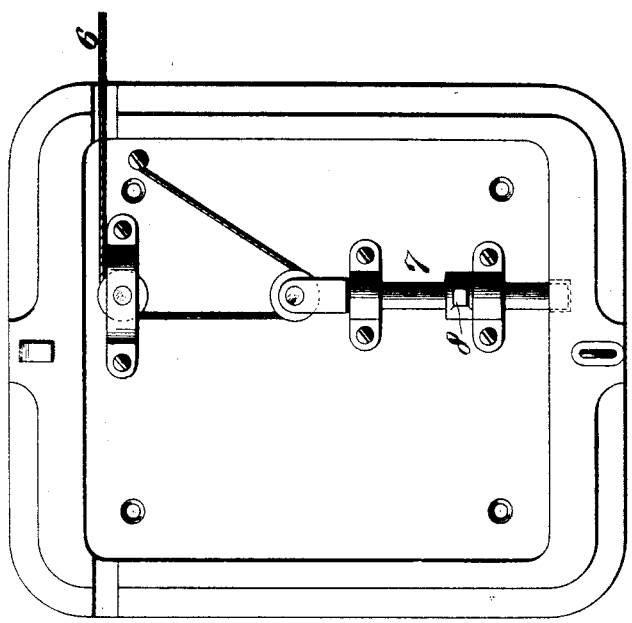
Figure 3:
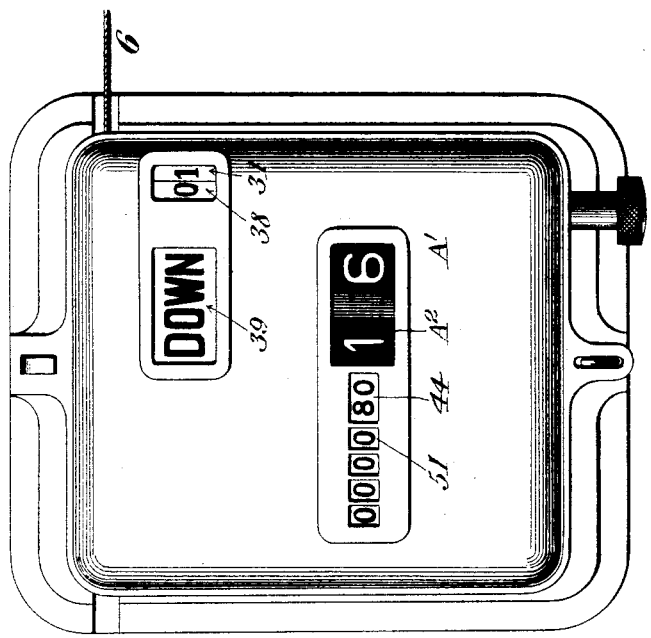

In the accompanying drawings, which form a part of this specification, Figure 1 is a side elevation of my device with the casing thereof in section. Fig. 2 is a plan view with the casing removed. Fig. 3 is a plan view with the casing in place. Fig. 4 is a plan view of the portion back of the line 4 4 of Fig. 1. Fig. 5 is a plan, and Fig. 6 is an elevation, of the actuating-bar and its connections. Fig. 7 is an elevation, looking from the right in Fig. 1, of the trip-register wheels, showing by a partial section the spring locking or operating pin just after it has actuated the tens-wheel, and also showing the zero-register and direction-indicator lever in section on the line 7 7 of Fig. 1. Fig. 8 is a like view showing the pin about to move the tens-wheel. Fig. 9 is a detail showing the engagement of the pin on the trip-register wheel with the zero-register and direction-indicator lever. Fig. 10 is a section looking toward the right on the line 10 10 of Fig. 7. Fig. 11 is a section looking toward the left on the line 11 11 of Fig. 7. Fig. 12 is an elevation looking toward the left in Fig. 7 and showing the tens-wheel ready to move back to its starting-point. Fig. 13 is a horizontal section of the trip-register wheels on the line 13 13 of Fig. 12. Fig. 14 is an elevation of the zero-register and direction-indicator mechanism looking from the left in Figs. 1 and 2. Fig. 15 is a section on the line 15 15 of Fig. 14, looking from the left; and Fig. 16 is a detail view of the gearing used in the money-register.

The trip register A, comprises two or more wheels so mounted as to be parallel and each marked on its periphery with the ten digits and arranged back of an opening in the casing to expose one digit on each wheel in the manner common in the art. The money register B, likewise consists of several wheels mounted on the same shaft, as shown in the drawings, or in any other way so as to render them parallel wheels, one of which bears numerals designating the several multiples of five, or any other desired number, between 0 and 100; the other wheels each bearing the ten digits.

The several numeral bearing wheels are geared together and arranged as fully described hereinafter, so that once for every rotation of each wheel, the wheel next to it on the left is driven one space, thereby exposing to view through an opening in the casing a new figure made up of the several exposed digits, indicating the total amount of fares collected. The five-cent wheel is driven by the actuating bar, 1, simultaneously with the units wheel of the trip register.

The zero register and direction indicator, C, is composed of a wheel indicating the direction of the trip and digit bearing wheels arranged to indicate the number of trips. The zero register and direction indicator comprises a pawl and ratchet, and is actuated by a pin, 13, on the units wheel of the trip register arranged to strike against and operate the pawl lever, 18, when said units wheel is moved backwardly beyond its zero point. It is, therefore, impossible to operate the zero register and direction indicator until the trip register A is returned to zero.

A reciprocating bar, 1, (see Figs. 1, 2, 5, and 6) carries two spring actuated pawls, 2, 3, arranged to act upon the ratchet wheels of the trip register A and the money register B, respectively. Preferably, these pawls are pivoted to a cross piece, 87, fixed to the reciprocating bar, and their springs may be the ordinary helical springs coiled around said cross piece and fastened thereto at one end. The outer ends of the pawls are beveled off, and inclined housings or guides 4, are provided therefor, whereby, as the beveled end rides along its inclined guide, it is thrown away from its ratchet wheel. As shown in the drawings there are twenty numbers on the five cent wheel or wheel of lowest denomination of the money register B and only ten on the units wheel, A' of the trip register. Therefore, the angular movement of the units wheel of the trip register must be twice as much as that of the five-cent wheel. The proper movements are accomplished by arranging the respective pawls and housings so that one pawl is kept away from the ratchet of the five-cent wheel during a portion of the movement of the actuating bar, during which portion, the other pawl is operating on the ratchet of the units wheel of the trip register. Divers other means for obtaining this differential movement may be suggested; but I consider it preferable to keep the pawl which acts on the trip register about one twentieth of the circumference in advance of the pawl which acts on the five-cent wheel.

The reciprocating bar, 1, is retracted by a spring or springs, 5, and is actuated by a pull cord 6 extending through the car in reach of the conductor. It is desirable to have this pull cord, 6, act directly or by pulleys on a reciprocating bolt, 7, (see Figs. 4 and 6) which has a lug, 8, thereon moving in a slot guide provided therefor and engaging a lug 25, on the actuating bar, 1, which likewise moves in said slot.

The reciprocating bar, 1, carries a pawl, 9, pivoted thereto and extending longitudinally therewith, said pawl being held in position by a suitable spring or springs 10, which allow it a slight movement to either side. At the end of this pawl is a backwardly projecting lug, 11, (see Figs. 1, 5, and 6) beveled off to form a ratchet tooth on each side adapted to co-operate with a ratchet bar, 12. The ends of said ratchet bar, 12, and the flat sides of said lug are beveled off to form inclined planes or cam surfaces for guiding the lug to one side or other of the ratchet bar, the spring or springs 10, tending to keep it in the center. This ratchet bar, 12, is arranged in line with the pawl, 9, and has its ends beveled parallel with each other. The two sides of the ratchet bar 12 are provided with ratchet teeth arranged in opposite directions, the teeth on the side toward which the pawl is crowded in its forward movement by the beveled end, being arranged to permit a forward movement and prevent a backward movement of the pawl, and the teeth on the other side being arranged to permit a backward movement and prevent a forward movement. This arrangement of the pawl and ratchet bar therefore constitutes a full or complete stroke mechanism.

The tail piece of a spring actuated striker, 61, of a register bell, 60, is arranged in the path of the pawl, 9, to be tripped thereby as shown in Fig. 5. It is preferable to have the bell sounded on the back stroke of the pawl after the register has been operated.

The operation of the device so far as described is as follows: A pull upon the cord 6 communicates motion through the intermediate connections to the actuating bar, 1, whose pawls 2, 3, in their forward movement engage and turn their respective ratchet wheels, the first portion of the movement of the money register pawl being lost on account of that pawl being held by its guide, 4, out of contact with its ratchet wheel. The money register wheel and the trip register wheel are thus simultaneously moved one space, and the actuating bar is retracted by its springs, 5, into position to repeat the operation. During the forward movement of the actuating bar, the pawl, 9, rides along the beveled end of the ratchet bar, 12, against the resistance of its spring, 10, which presses the pawl tooth into engagement with the ratchet teeth. The actuating bar having once begun a forward movement cannot return until the pawl tooth has got past the end of the ratchet bar, at which position the centering spring presses the pawl into position to have its tooth, in the backward movement of the actuating bar, ride the beveled end surface of the ratchet bar 12 till it engages the teeth on the other side thereof. In this position, the actuating bar cannot be moved forwardly, but must continue its backward movement to the point where the operation began. This action, therefore, insures the movement of both the trip register and the money register a single space each and the ringing of the bell; as, even if the actuating bar should stop before completing the entire operation, it must still go through with the entire cycle of operation from the point where it left off before it can begin the next.

The trip register, illustrated in Figs. 7 to 13, inclusive, is largely similar to that shown in my Patent No. 505,167. It consists of two or more numeral bearing wheels, each having a ratchet wheel, $A^3$, fixed thereto. The ratchet, $A^3$, on the units wheels is operated, step by step, by the pawl, 2, on the actuating bar (see Figs. 1 and 6); and the tens wheel, $A^2$, is operated by a pin, 13, on the units wheel, which pin once in each rotation of the units wheel is pressed into engagement with the ratchet of the tens wheel and continues so for one space, when it is released automatically and retracted by a spring provided for that purpose.

The units wheel of the trip register is returned to its starting point by any suitable device, as, for instance, by a shaft 26 adapted to be turned by hand and carrying a gear wheel 27 which meshes with a gear 28 on the units wheel, as shown in the drawings. The tens wheel is loose on its shaft, 30, and has a spiral spring 29, fixed to the shaft, 30, at one end and to the wheel at the other so as to be wound up by the forward movement of the wheel. A dog, 14, is pivoted on any convenient portion of the framework to ride up the ratchet teeth of the tens wheel and automatically drop into engagement therewith. This dog is arranged to have a part lie in the path of a spring tripping device, 15, (see Fig. 11) carried on the units wheel in an inclined position, whereby it will yield in its forward movement as it rubs with its side against the dog, but arranged to lift the dog out of engagement with the ratchet wheel as its end squarely strikes the under side of said dog in the backward movement of said tripping device. When the dog 14 is thus disengaged from the tens wheel, said wheel is rotated back by the spiral spring, until a lug 16, on the wheel strikes the end portion of the dog 14. This end portion of the dog is turned over as shown at 14ᵃ (Figs. 10, 11, and 12) to form a tooth by which it can co-operate with the ratchet wheel; and the lug 16 on the numeral wheel is arranged so that its line of motion will pass through the tooth 14ᵃ in its raised position, that is, the position said tooth occupies when the dog is raised by the spring 15. The tens wheel is thus brought to rest in the zero position because the lug, 16, on the wheel strikes against the stop 14ᵃ at the end of the dog, 14.

The arrragement of the tripping device should be such as to disengage the tens wheel just after the units wheel has passed over the zero point in its backward movement.

The zero register and direction indicator (see Figs. 1, 2, and 9) is operated step by step by a pawl, 17, engaging a ratchet wheel, 40, on the register shaft, 33. This pawl, 17, is part of or pivotally carried on a lever or arm, 18, which may be pivoted to the trip register shaft, the motion of said pivoted arm being limited by fixed stops, 19, so located as to let the pawl move the zero register and direction indicator to turn a single space and no more. The pivoted arm, 18, is moved by the locking or operating pin, 13, on the units wheel of the trip register, when said wheel is turned backwardly beyond its zero point and at the same time when the tens wheel of the trip register is disengaged from its dog, 14. The side of the lever arm, 18, toward which the pin, 13, moves in its forward movement, is beveled off in the path of the pin, thereby constituting an inclined plane or cam portion, and as the units wheel moves forwardly, the pin, 13, thereon rides along said inclined cam portion and the flat side of the lever and is pressed inwardly thereby into engagement with the ratchet on the tens wheel when the units wheel registers "9."

From the point on the inclined plane, at which the pin is forced into engagement with the ratchet on the tens wheel, to the top edge of said lever, the distance is only one tenth of the circumference in angular measure so that the pin is allowed to be pressed out by its spring clear of the tens wheel, as shown in Figs. 7 and 8, as soon as it has moved the tens wheel one space; and it then lies just above said lever in position to turn said lever when the units wheel is moved backwardly. Of course, if the width of the lever itself is not sufficient to make up this angular distance, a separate piece may be fixed thereto as an extension; or such separate piece may have the incline also.

The back stop 19 of the pivoted arm, 18, should be located to prevent the units wheel being turned back to "9;" and the arm and pawl are returned to normal position by a spring or springs provided for the purpose.

The units wheel, 31, of the zero register has cog teeth or a cog wheel, 32, fastened thereto or to its shaft, 33; and this cog wheel meshes with a cog wheel, 34, having the same number of teeth and being on a separate shaft, 35. Said cog wheel, 34, carries a large tooth, 36, adapted to co-operate once in each rotation with a star wheel, 37, of ten teeth, which star wheel is fixed to the tens wheel, 38, which rotates loose on the shaft, 33, whereby said tens wheel is moved forward one space for each rotation of the units wheel, as is common in the art.

The indicator drum or wheel, 39, of the direction indicator is preferably fixed to the same cog wheel, 32, as the zero register so as to move therewith, as shown in Figs. 2 and 14. Obviously, however, similar but independent connecting and operating devices may be used for moving the zero register and the direction indicator, which, when connected as shown, form together practically a single register with two indications. Obviously, also, either the zero register or the direction indicator may be omitted without departing from my invention.

For the purpose of centering and steadying the numeral and indicator wheels back of their respective openings, it is preferable to have scalloped wheels, 41, fixed thereto and to have small rollers, 42, pressed against the same by spring arms, 43, which form supports for said rollers. A similar arrangement is used upon the trip register as indicated by the spring pressed rollers, 42′, shown in the drawings.

The connecting devices of the money or total register are practically the same as those of the zero register just described. The five cent wheel, 44, is operated, as hereinbefore stated, by the pawl, 3, on the actuating bar, 1, engaging the ratchet wheel, 45, on said wheel, 44. This five cent wheel, 44, (see Fig. 16) has a cog wheel, 46, fastened thereto which meshes with a cog wheel, 47, of the same number of teeth but working loosely on a separate shaft, 48. This second cog wheel, 47, carries a single long tooth, 49, adapted to co-operate with a star wheel, 50, having ten teeth and fixed to the tens wheel, 51, so that once in each rotation of the five cent wheel, 44, the tens wheel 51, is moved forward a tenth of a revolution by means of said tooth, 49. The tens wheel, 51, likewise has a cog wheel, 52, fastened thereto, which in turn meshes with an idle cog wheel, 53, carrying an operating tooth arranged to operate the hundreds wheel by means of a star wheel thereon; and so on, the wheel to the right operating the one next to it on the left.

The five cent wheel may have a scalloped wheel fastened thereto, as shown at 54 in Fig. 2, and with this scalloped wheel a steadying roller carried on a spring arm may cooperate, as shown at 55. Likewise, steadying rollers, 56, may be used to co-operate with scalloped wheels, 57, on the idle cog wheels, as shown in Figs. 2 and 16.

What I claim as new, and desire to secure by Letters Patent, is—

1. A street car register, comprising a trip register wheel and a money register wheel having ratchet teeth thereon and an actuating bar carrying pawls adapted to cooperate with said ratchet teeth on the passenger register wheel and the money register wheel, respectively, said pawls being provided with housing guides arranged to keep the money register pawl out of engagement with its ratchet longer than the trip register pawl is out of engagement with its ratchet, substantially as described.

2. A street car register, comprising a trip register wheel and a money register wheel having ratchet teeth thereon and an actuating bar carrying pawls adapted to cooperate with said ratchet teeth on the trip register wheel and the money register wheel, respectively, and guides for said pawls adapted to hold said pawl of the money register wheel out of engagement with its ratchet longer than the trip register pawl is out of engagement with its ratchet, and a locking device consisting of a fixed ratchet bar and a spring operated pawl on said actuating bar to cooperate therewith, whereby said actuating bar is prevented from moving backwardly until it has reached the limit of its stroke, substantially as described.

3. In a trip register, the combination with the units wheel carrying a spring operated pin, of a tens wheel carrying a ratchet wheel which is operated by said pin, a dog for said ratchet wheel adapted to prevent backward movement thereof, and a lug on said tens wheel arranged to strike against the detent on said dog when the dog is lifted out of engagement with said ratchet wheel, and a self winding spring for returning said tens wheel to its starting point, substantially as described.

4. In a street car register, the combination with a zero register and a direction indicator and a trip register, of a spring operated pin on the units wheel of the trip register and a pivoted lever carrying a pawl adapted to operate said zero register and said direction indicator, said lever having an inclined portion arranged in the path of said pin, whereby the pin in its forward movement is permitted to ride said incline, but in its backward movement actuates said lever, substantially as described.

5. In a street car register, the combination with the zero register and the trip register, of a spring operated pin on the units wheel of the trip register and a pivoted lever carrying a pawl adapted to operate said zero register, said lever having an inclined portion arranged in the path of said pin, whereby said pin in its forward movement is permitted to ride over said incline, but in its backward movement actuates said lever, substantially as described.

6. In a street car register, the combination with the direction indicator and the trip register, of a spring operated pin on the units wheel of the trip register and a pivoted lever carrying a pawl adapted to operate said direction indicator, said lever having an inclined portion arranged in the path of said pin, whereby said pin in its forward movement is permitted to ride over said incline, but in its backward movement actuates said lever, substantially as described.

7. In a street car register, the combination with a zero register and a direction indicator and a trip register, of a spring operated pin arranged on the units wheel of the trip register to project through the same and engage a ratchet on the tens wheel, and a pivoted lever carrying a pawl adapted to operate the zero register and direction indicator, said lever having an inclined cam portion arranged in the path of said pin, whereby said pin in its forward movement rides said inclined portion into engagement with the ratchet on the tens wheel and turns the same, but in its backward movement actuates said lever, substantially as described.

8. In a street car register, the combination with a zero register and a trip register, of a spring operated pin arranged on the units wheel of the trip register to project through the same and engage a ratchet on the tens wheel, and a pivoted lever carrying a pawl adapted to operate the zero register, said lever having an inclined cam portion arranged in the path of said pin, whereby said pin in its forward movement rides said inclined portion into engagement with the ratchet on the tens wheel and turns the same, but in its backward movement actuates said lever, substantially as described.

9. In a street car register, the combination with a direction indicator and a trip register, of a spring operated pin arranged on the units wheel of the trip register to project through the same and engage a ratchet on the tens wheel, and a pivoted lever carrying a pawl adapted to operate the direction indicator, said lever having an inclined cam portion arranged in the path of said pin, whereby said pin in its forward movement rides said inclined portion into engagement with the ratchet on the tens wheel and turns the same, but in its backward movement actuates said lever, substantially as described.

O. E. MICHAUD.

Witnesses:
JAMES A. CARR,
WILLIAM P. CARR.